Figure 1:
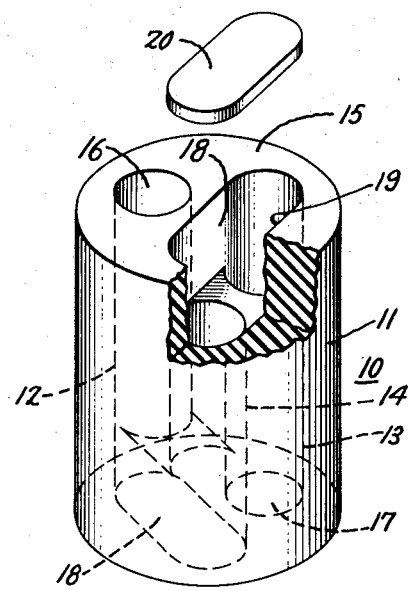

June 21, 1960

H. M. STRONG 2,941,251

REACTION VESSEL

Filed Dec. 21, 1955

Inventor:
Herbert M. Strong,
by Paul A. Frank
His Attorney.

United States Patent Office 2,941,251
Patented June 21, 1960

2,941,251

REACTION VESSEL

Herbert M. Strong, Schenectady, N.Y., assignor to General Electric Company, a corporation of New York Filed Dec. 21, 1955, Ser. No. 554,507

2 Claims. (Cl. 18—34)

My invention relates to reaction vessels and more particularly to such vessels which are subjected to high pressure and high temperature conditions.

In my copending application Serial No. 537,369, filed September 29, 1955, and assigned to the same assignee as the present invention, a reaction vessel is described and claimed which can be subjected to temperatures of the order of several thousand degrees centigrade and pressures of over 40,000 atmospheres for long time intervals by being positioned within a recessed member and opposed by a die. Such a vessel comprises a talc cylinder with a central aperture adapted to contain a specimen, and an electrically conductive closure for each end of the cylinder.

In high pressure high temperature apparatus, it is desirable to provide a reaction vessel which can accommodate a large amount of material to be heated and pressed. In previous devices, specimen size was limited by the dimensions of the aperture within the reaction vessel. An increase in vessel length caused lateral extrusion of the vessel from between a pair of opposed pressure members with attendant loss of pressure in the specimen. An increase in aperture diameter in relation to aperture length reduced the electrical resistance of the specimen with corresponding reduction in obtainable temperature. The critical aperture diameter was governed by the electrical resistance of the specimen which was subjected to the above pressure and temperature ranges. The invention of the present application provides a novel reaction vessel which permits an increase in specimen volume without a corresponding reduction in the pressure or temperature of the specimen.

Accordingly, it is an object of my invention to provide a new and improved reaction vessel.

It is another object of the invention to provide an improved reaction vessel which can be subjected to high pressures and temperatures.

It is a further object of the invention to provide an improved reaction vessel which can accommodate a large amount of material to be heated and pressed without an increase in vessel size.

In carrying out my invention in one form, a solid, thermally and electrically insulating cylinder has a plurality of passages therein connected in series relationship and an aperture at each end communicating with the opposite end of the passages to provide a reaction vessel which is adapted to contain a specimen for subjection to high temperature high pressure conditions.

Figure 2:
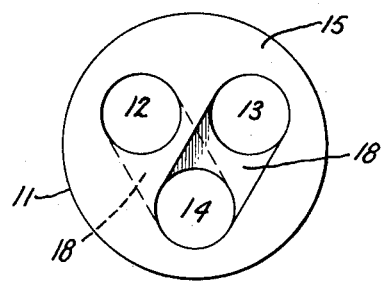

These and various other objects, features and advantages of the invention will be better understood from the following description taken in connection with the accompanying drawing in which:

Fig. 1 is a perspective view of a reaction vessel which embodies my invention; and Fig. 2 is an end elevation view of the reaction vessel of Fig. 1.

In Fig. 1 of the drawing, a reaction vessel 10 is shown which comprises a solid cylinder 11 of thermally and electrically insulating material with three generally lengthwise passages 12, 13 and 14 therein. One end 15 of cylinder 11 is provided with an aperture 16 which communicates exteriorly of cylinder 11 and with passage 12 while the opposite cylinder end is provided exteriorly of cylinder 11 and with an aperture 17 which communicates with passage 13. A connecting passage 18 is located adjacent each end of cylinder 11 to connect passages 12 and 13 in series relationship with passage 14. Passages 12, 13, 14 and 18 define a continuous chamber which is adapted to contain a specimen to be subjected to high temperature and high pressure conditions. Each end of cylinder 11 has an opening 19 which communicates with its associated connecting passage 18. A removable, thermally and electrically insulated closure 20 is positioned in each opening 19 to insulate connecting passages 18 from exterior contact with an electric current which is supplied to cylinder 11. Both cylinder 11 and closure 20 can be made of suitable material, such as, pyrophyllite, catlinite or talc. If it is desired, a plurality of longitudinal and connecting passages can be connected in series relationship within the reaction vessel.

Reaction vessel 10 is assembled by filling passages 12, 13, 14 and 18 with an electrically conductive specimen (not shown). After these passages are filled, a closure 20 is positioned in each opening 19 to complete the assembly. Reaction vessel 10 is then subjected to any desired high temperature and high pressure condition in an apparatus such as set forth in a copending application of Howard T. Hall, Serial No. 488,050, filed February 14, 1955, and assigned to the same assignee as the present application in which there is illustrated an aperture defined by an annular ring in axial alignment with a pair of opposed dies. An electrical circuit is established between the dies and through the reaction vessel positioned within the ring. An electrical circuit is established from a source of power in such an apparatus through apertures 16 and 17 in cylinder 11 to generate uniform heat in the specimen within passages 12, 13, 14 and 18. The present reaction vessel accommodates a large amount of specimen in the continuous chamber in which the electrical resistance can be maintained at a sufficient value to generate the desired heat.

As will be apparent to those skilled in the art, the objects of my invention are attained by the use of a solid, thermally and electrically insulating cylinder with a plurality of passages therein connected in series relationship and an aperture at each end of the cylinder communicating with the opposite end of the passages to provide a reaction vessel for subjection to high temperature and high pressure conditions.

While other modifications of this invention and variations of apparatus have not been described, the invention is intended to include all such as may be embraced within the following claims.

What I claim as new and desire to secure by Letters Patent of the United States is:

1. A reaction vessel comprising a solid, thermally and electrically insulating cylinder, said cylinder provided with a plurality of lengthwise passages therein, one end of said cylinder provided with an aperture communicating with one of said passages, the other end of said cylinder provided with an aperture communicating with another of said passages, said cylinder provided with a plurality of connecting passages adjacent each end connecting the lengthwise passages in series relationship, each end of said cylinder provided with openings communicating with its associated connecting passages, and a removable thermally and electrically insulated closure for each of said openings.

2. A reaction vessel comprising a solid, thermally and electrically insulating cylinder, said cylinder provided with three lengthwise passages therein, one end of said cylinder provided with an aperture communicating with a first passage, the other end of said cylinder provided with an aperture communicating with a second passage, said cylinder provided with a connecting passage adjacent each end connecting a third passage in series relationship with said first and second passages, each end of said cylinder provided with an opening communicating with its associated connecting passage, and a removable, thermally and electrically insulated closure for each of said openings.

References Cited in the file of this patent

UNITED STATES PATENTS

| | | |
|---|---|---|
| 272,069 | Mace | Feb. 13, 1883 |
| 1,330,003 | Rodesson et al. | Feb. 3, 1920 |
| 2,123,122 | Shaw | July 5, 1938 |
| 2,541,069 | Jones et al. | Feb. 13, 1951 |
| 2,544,414 | Bridgman et al. | Mar. 6, 1951 |
| 2,563,604 | Hultgren | Aug. 7, 1951 |
| 2,591,762 | Zaikowsky | Apr. 8, 1952 |
| 2,714,977 | Davis | Aug. 9, 1955 |

OTHER REFERENCES

Parsons: "Phil. Trans. of the Royal Society," vol. 220 (A), pages 67–75, 85–87, 92–101 (1919).

Gunther et al.: "Z Anorg. Allgem. Chem.," vol. 250, pages 357–372 (1943).

Bridgman: "J. Chem Physics," vol. 15, pages 92–98 (February 1947).